(12) United States Patent
Suarez et al.

(10) Patent No.: US 7,830,745 B2
(45) Date of Patent: Nov. 9, 2010

(54) IDENTIFYING THE Q-FACTOR USING MICROSEISMIC EVENT GENERATED S-CODA WAVES

(75) Inventors: Yoscel Suarez, Norman, OK (US); Joel Le Calvez, College Station, TX (US)

(73) Assignee: Schlumberger Technology Corporation, Houston, TX (US)

( * ) Notice: Subject to any disclaimer, the term of this patent is extended or adjusted under 35 U.S.C. 154(b) by 396 days.

(21) Appl. No.: 11/965,150

(22) Filed: Dec. 27, 2007

(65) Prior Publication Data

US 2009/0168599 A1    Jul. 2, 2009

(51) Int. Cl.
*G01V 1/00* (2006.01)
(52) U.S. Cl. .................. 367/31; 367/32; 166/250.1
(58) Field of Classification Search ........... 367/25, 367/31, 32; 166/250.1
See application file for complete search history.

(56) References Cited

U.S. PATENT DOCUMENTS

| 5,377,104 | A  | * | 12/1994 | Sorrells et al. ............. 702/11 |
| 5,996,726 | A  | * | 12/1999 | Sorrells et al. ............. 367/86 |
| 6,012,017 | A  | * | 1/2000  | Van Bemmel et al. ........ 702/14 |
| 6,766,255 | B2 | * | 7/2004  | Stone ..................... 702/13 |
| 7,134,492 | B2 | * | 11/2006 | Willberg et al. .......... 166/250.1 |
| 2003/0051873 | A1 | * | 3/2003 | Patzek et al. ........... 166/250.01 |

OTHER PUBLICATIONS

Fehler, et al. Simultaneous inversion for Q and source parameters of microseismic earthquakes accomanying hydraulic fracturing in granite rock. Bulletin of the Seismological Society of America, Apr. 1991, v. 81, No. 2.*
Talebi, et al. Source Parameters of Injection-induced Microseismicity. Pure and Applied Geophysics, 153 (1998).*
Aki, Keiiti. CDSP: The Seismology of Continental Thermal Regimes. MIT Department of Earth, Atmospheric, and Planetary Sciences. Feb. 1985.*
Kumar et al., "Estimation of coda wave attenuation for NW Himalayan region using local earthquakes", Physics of the Earth and Planetary Interiors 151 (2005), pp. 243-258.
Bennett et al., "The Source for Hydraulic Fracture Characterization", Oilfield Review, Winter 2005/2006, pp. 42-57.

* cited by examiner

*Primary Examiner*—Mark Hellner
(74) *Attorney, Agent, or Firm*—Yee & Associates, P.C.

(57) ABSTRACT

A method and system model of the formation and rock matrices in a well site. A microseismic event from a hydraulic fracture in a well bore is recorded at a monitoring well site. The S-coda wave window of the microseismic event is identified. Q-factors for a set of frequencies within the S-coda wave window are then identified.

25 Claims, 5 Drawing Sheets

IDENTIFYING THE Q-FACTOR USING MICROSEISMIC EVENT GENERATED S-CODA WAVES

BACKGROUND OF THE INVENTION

1. Field of the Invention

This invention relates to methods and systems for use in oilfield data gathering. In particular, the invention provides a method, apparatus and system for estimating the Q-factor using S-Coda waves obtained from the microseismic events recorded during reservoir monitoring.

2. Background of the Invention

When a seismic event occurs, seismic waves propagate away from the source of the seismic event. During the propagation, seismic energy in several types of waves can be identified, depending on the direction of propagation and the character of such waves. Three main kinds of seismic energy are typically propagated after a seismic source has been triggered. These types of seismic energy are the transverse primary waves (P waves) and two types of shear secondary waves (S waves). The shear S waves include longitudinal shear S-waves and residual S-coda waves. An S-coda wave is the energy train that follows an S-wave. These residual vibrations decay very slowly over time. The signature of the S-coda wave is dependant on the rock properties that the wave has traveled through.

S-coda waves may be obtained from microseismic events recorded during the monitoring of hydraulic reservoir stimulation. Since the microseismic events are generated at different levels within and around the formation, contrasting properties can be inferred regarding the interval of interest by calibrating such differences with the S-coda wave response. This relationship can be established since the S-coda waves are sensitive to frequency absorption. Such property is closely related to propagation velocity, which is important for accurate processing and interpretation of microseismic events.

As S-coda waves propagate through the surrounding rock matrix, energy is absorbed from the wave into the surrounding rock matrix, producing a change of amplitude and velocity with frequency, thus changing the waveform and attenuating the high frequencies. These dispersion and attenuation phenomena are mainly caused by heterogeneities within the formation. A better understanding of such seismic responses can result in a better handling of such heterogeneities within the formation.

Therefore, the quality factor, or Q-factor, becomes an important property determination of the rock because the Q-factor represents a direct relationship with the attenuating character of the formation. The Q-factor is a measure of how formations in the earth attenuate and disperse acoustic seismic energy. Among other uses, the Q-factor is an indication of the presence of hydrocarbons within a formation. By knowing the Q-factor, water saturation and hydrocarbon concentrations in a formation can be inferred. The Q-factor compares the time constant for decay of an oscillating physical system's amplitude to the oscillation period for the physical system. Equivalently, the Q-factor compares the frequency at which a system oscillates to the rate at which the system dissipates energy. A higher Q-factor indicates a lower rate of energy dissipation relative to the oscillation frequency.

Since absorption is affected by the properties of the fluids within the pore space and the architecture of the matrix, several characteristics can be related to the Q-factor, such as et alia, porosity, permeability, and the degree of fracturing.

SUMMARY OF THE INVENTION

In view of the above problems, an object of the present invention is to provide methods, apparatuses and systems for estimating the Q-factor using S-coda waves obtained from the microseismic events recorded during reservoir monitoring. A method for modeling formation and rock matrices in a well site is described. A microseismic event is recorded, identifying an S-coda wave window within the microseismic event. The S-coda wave window includes a set of frequencies. A Q-factor is then identified for each frequency in the set of frequencies.

The microseismic event can be generated at a first location, wherein the microseismic event is recorded at a second location different from the first location. The first location can be a well bore, and the microseismic event can be generated from a hydraulic fracture from the well bore. The microseismic event can be recorded with at least one multi-component geophone.

Identifying the S-coda wave window can include recording the amplitude of the microseismic event and the frequency of the microseismic event.

The method for modeling formation and rock matrices in a well site can include decomposing the set of frequencies into a group of frequency ranges, and then selecting several representative frequencies from the plurality group of frequency ranges. Identifying the Q-factor for the set of frequencies can include identifying a corresponding Q-factor for each of the representative frequencies. A variation in velocities of the group of frequency ranges is analyzed to determine variations in formation and rock composition. The Q-factor can be used to manage a reservoir or production at a well bore.

After the P- and S-wave arrivals are identified, the S-coda window is extracted from the microseismic event traces and used as the input of a spectral decomposition application. When the S-coda wave is decomposed into its single frequencies via a spectral decomposition method, several frequencies of interest that are included within the bandwidth of the data are chosen, taking into account that the maximum recoverable frequency is the Nyquist frequency. Using the slope of the linear trend for the plot of $LN(A_{RMS}*Time)$ versus time, the values of Q-factor for each single frequency are estimated. Then, for each geophone the same operation is repeated and a plot of Q-factor versus geophone location gives a sense of the attenuation (1/Q) with depth. Also, from the slope of the plot of Q-factor versus frequencies, the relations between velocity, Q-factor and frequency can be determined. Using several microseismic events within the formation, the variation of Q-factor can be studied within an area to differentiate different zones with contrasting attenuation signatures. When calculating the spectral decomposition, different sliding windows can be used to compare the variations of the Q-factor versus time of propagation. These sliding windows may be useful in observing any attenuation changes within an interval.

Other objects, features and advantages of the present invention will become apparent to those of skill in art by reference to the figures, the description that follows, and the claims.

BRIEF DESCRIPTION OF THE DRAWINGS

In the following detailed description of the preferred embodiments and other embodiments of the invention, reference is made to the accompanying drawings. It is to be understood that those of skill in the art will readily see other embodiments and changes may be made without departing from the scope of the invention.

DETAILED DESCRIPTION OF THE INVENTION

In a typical drilling operation, several well bores are located strategically around a field in order to maximize production of the oil or gas contained within the field. After a well bore is drilled into formation rock that contains oil, natural gas, and water, maximization of the production of oil and gas is a primary goal. Production of oil and gas can be increased by improving or maximizing the flow of fluids to the well. By connecting the many pre-existing fractures and flow pathways in the reservoir rock with a larger fracture, the larger fractures act as a conduit, conducting fluid more quickly and efficiently out from the formation rock to the well bore. This larger, man-made fracture starts at the well and extends out into the reservoir rock for as much as several hundred feet.

By recording a microseismic event that is generated from a hydraulic fracture in a well bore, the S-coda wave window of the microseismic event can be identified. Q-factors for a set of frequencies within the S-coda wave window are then identified. By knowing the Q-factor, water saturation, and hydrocarbon concentrations in a formation can be inferred. Therefore, better informed decisions regarding the drilling and production of hydrocarbons at the well site and/or the reservoir in which the well site is located can be made.

Figures 1, 3:
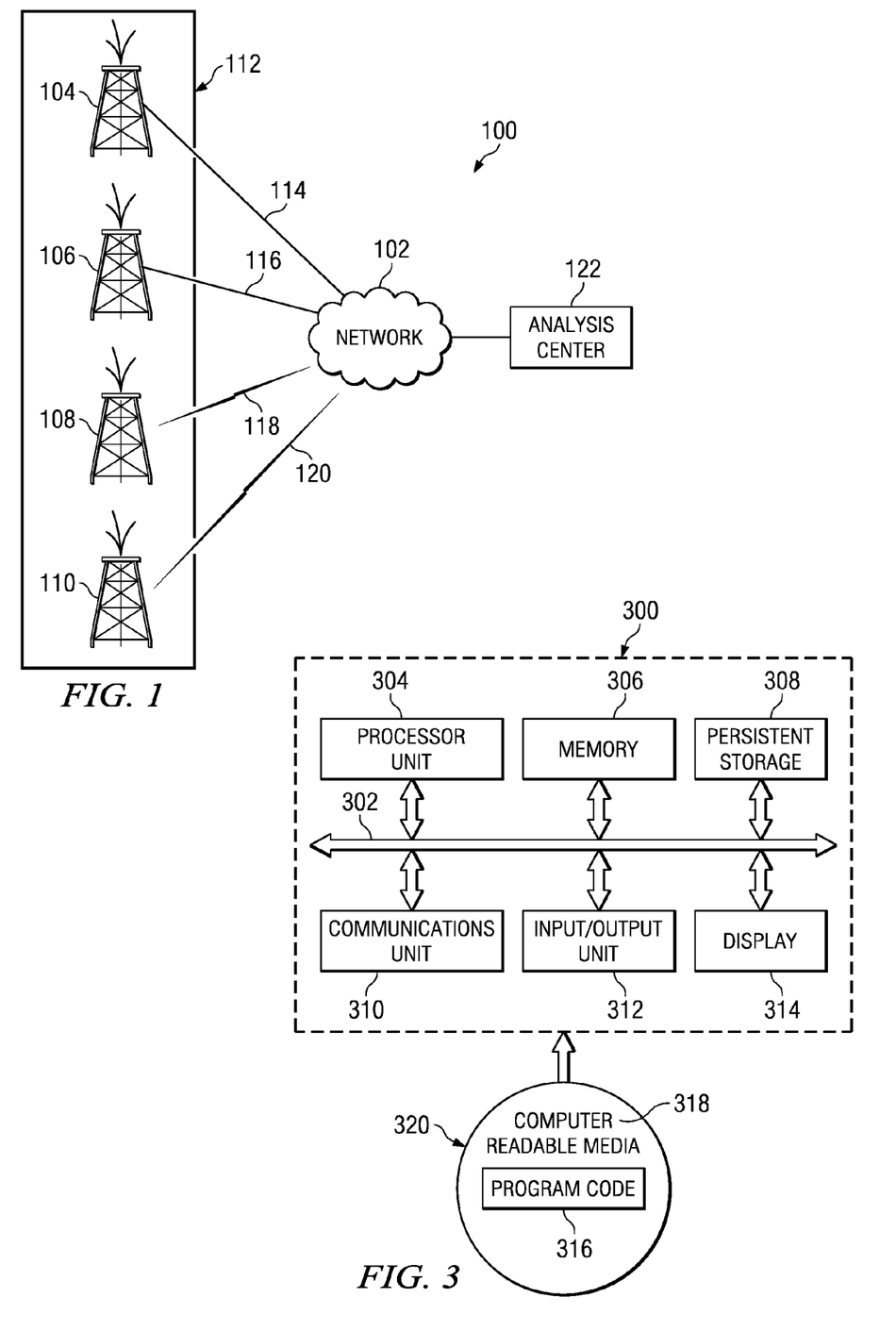
FIG. 1 is a pictorial representation of a network data processing system in which an illustrative embodiment of the present invention may be implemented.
FIG. 3 depicts a diagram of a data processing system in accordance with an illustrative embodiment.

With reference now to FIG. 1, a pictorial representation of a network data processing system is depicted in which an illustrative embodiment of the present invention may be implemented. In this example, network data processing system 100 is a network of computing devices in which different embodiments of the present invention may be implemented. Network data processing system 100 includes network 102, which is a medium used to provide communications links between various devices and computers in communication with each other within network data processing system 100. Network 102 may include connections, such as wire, wireless communications links, or fiber optic cables. The data could even be delivered by hand with the data being stored on a storage device, such as a hard disk drive, DVD, or flash memory.

In this depicted example, well sites 104, 106, 108, and 110 have computers or other computing devices that produce data regarding wells located at these well sites. In these examples, well sites 104, 106, 108, and 110 are located in geographic region 112. This geographic region is a single reservoir, as described in these examples. Of course, these well sites may be distributed across diverse geographic regions and/or over multiple reservoirs, depending on the particular implementation. Well sites 104 and 106 have wired communications links 114 and 116 to network 102. Well sites 108 and 110 have wireless communications links 118 and 120 to network 102.

Analysis center 122 is a location at which data processing systems are located to process seismic data and other data collected from well sites 104, 106, 108, and 110. Depending on the particular implementation, multiple analysis centers may be present. These analysis centers may be, for example, at an office or on-site in geographic location 112 depending on the particular implementation. In these illustrative embodiments, analysis center 122 analyzes data from well sites 104, 106, 108, and 110 using processes for different embodiments of the present invention.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for different embodiments. This information may be used in the management of a well site or the determination of potential drilling sites. For example, the information may be used to direct drilling operations for the well site.

Figure 2:
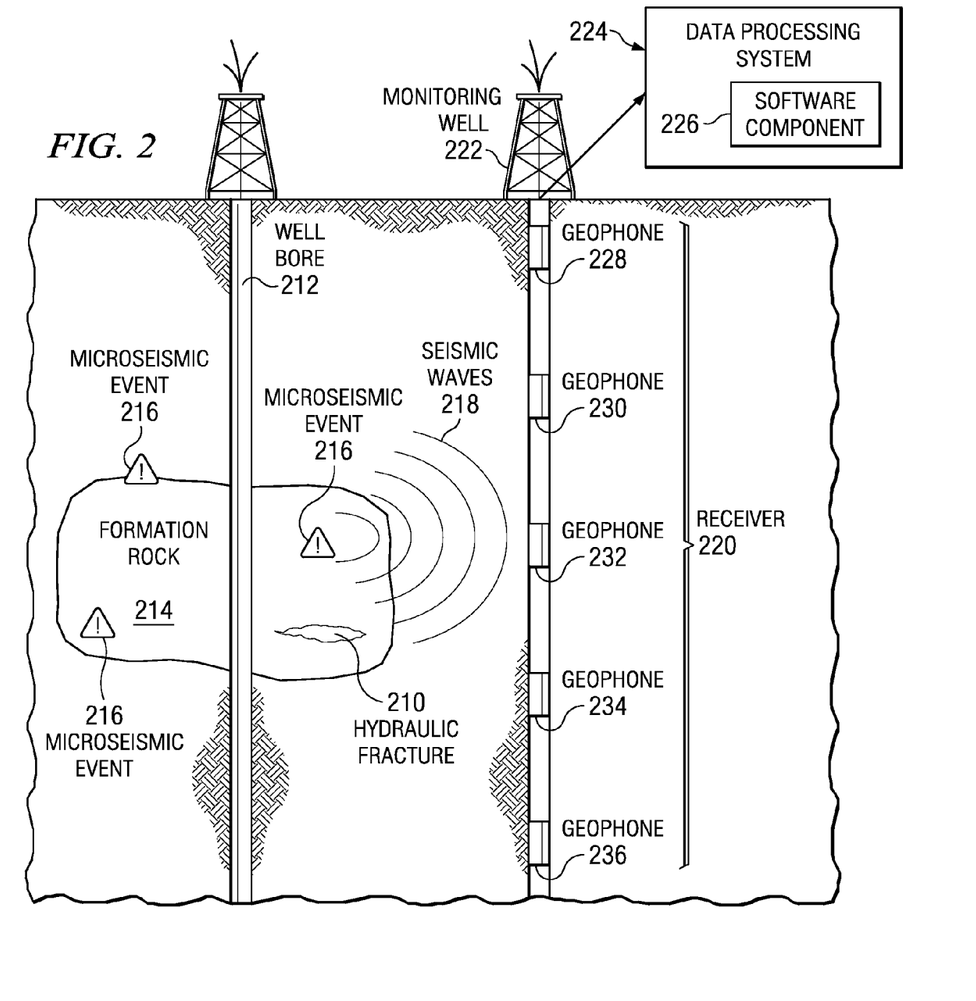
FIG. 2 is a block diagram illustrating a system for processing microseismic events in accordance with an illustrative embodiment.

Referring now to FIG. 2, a block diagram illustrating a system for processing microseismic events is shown in accordance with an illustrative embodiment. Hydraulic fracture 210 is formed by pumping a fracturing fluid into well bore 212 of a well site, such as well sites 104, 106, 108, and 110 of FIG. 1. The fracturing fluid is pumped into well bore 212 at a rate sufficient to increase the downhole pressure to a value in excess of the fracture gradient of the formation rock 214. The increased pressure then causes formation rock 214 to crack which allows the fracturing fluid to enter and extend the crack further into the formation. The cracking of formation rock 214, as well as any expansion or relaxation thereof, creates microseismic event 216.

Microseismic event 216 is a vibration or series of vibrations caused by sudden failure of rock releasing stored strain energy. Microseismic event 216 generates seismic waves 218, including the compressional primary waves (P-waves), the shear secondary waves, (S-waves), and the residual S-coda waves. These waves propagate away from microseismic event 216 and are detected by receiver 220. Receiver 220 can be a VSI Versatile Seismic Imager, available from Schlumberger Ltd. The geophones within receiver 220 can be Geophone Accelerometer (GAC-D), also available from Schlumberger Ltd. Receiver 220 is a sensitive seismic instrument capable of detecting microseismic event 216.

Microseismic hydraulic fracture monitoring is a borehole seismic technique used for detecting micro-acoustic energy caused by the changes in the "in-situ" stress of the rock matrix. By placing receiver 220 in or near the producing reservoir, usually in a second nearby well bore, continuous measurements of the microseismic activity in the reservoir characterize physical properties that are changing within that reservoir. Physical properties that can change within that reservoir include, but are not limited to, stress fractures, fluid content, fluid mobility, and thermal profiles.

Receiver 220 may be one or more multi-component geophones 228-236 placed in a monitoring well 222 to determine the location of microseismic event 216. In these examples, geophones 228-236 are highly sensitive ground motion transducers that measure vibrations in the ground by converting ground movement into voltage, which may be recorded at a recording station. The deviation of this measured voltage from the base line is called the seismic response and is analyzed for structure of the earth.

Geophones 228-236 typically consist of a mass suspended on a spring. A wire is wrapped around the mass. A magnet, that is stationary with respect to the surrounding formation, surrounds the wire-wrapped mass. When the ground moves, such as when a microseismic event occurs, the mass tends to remain motionless while the magnet moves with the surrounding formation, around the mass. The magnetic field of the moving magnet produces an electrical voltage in the wire. This voltage is amplified and recorded by a simple voltmeter. The voltage recorded by the voltmeter is proportional to the magnitude at which the ground is moving.

The distance of receiver 220 to microseismic event 216 can be calculated by measuring the difference in arrival times between the compression, or primary (P-) waves, and the shear, or secondary (S-) waves. Hodogram analysis, which examines the particle motion of the P-waves, may similarly be used to determine the azimuth angle to the event. The depth of microseismic event 216 is constrained by using the P- and S-wave arrival delays between the receivers observed at monitoring well 222. This localization technique requires an accurate velocity model from which to calculate event locations, a low noise environment, highly sensitive geophones to record microseismic event 216, and knowledge of the exact location and orientation of receiver 220.

Receiver 220 is deployed in monitoring well 222 within 2000 feet of well bore 212 at roughly the same depth as the formation rock 214. Monitoring well 222 is typically a production well bore within the field wherein receiver 220 is placed to measure microseismic events, such as microseismic event 216. The optimal placement and geometry of receiver 220 within monitoring well 222 are heavily dependent on the surrounding rock matrix structure. However, due to other well site variables, the ideal spatial configuration between receiver 220 and well bore 212 rarely occurs.

Receiver 220 forwards the data collected from microseismic event 216 to data processing system 224 for analysis.

Data processing system 224 can be analysis center 122 of FIG. 1. Software component 226 running on data processing system 224 isolates the S-coda waves from microseismic event 116. Software component 226 then utilizes the isolated S-coda waves to determine Q-factors for the formation rock 214. This information may be used in the management of a well site or in the determination of potential drilling sites. For example, the information may be used to direct drilling operations for the well site.

Turning now to FIG. 3, a diagram of a data processing system is depicted in accordance with an illustrative embodiment. Data processing system 300 can be data processing system 124 of FIG. 1. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multiprocessor core, depending on the particular implementation. Further, processor unit 304 may be implemented using one or more heterogeneous processor systems in which a main processor is present with secondary processors on a single chip. In another illustrative example, processor unit 304 may be a symmetric multi-processor system containing multiple processors of the same type.

Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as, program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive or a flash memory that is connected to data processing system 300. The tangible form of computer readable media 318 is also referred to as computer recordable storage media.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

For example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache, such as found in an interface and memory controller hub that may be present in communications fabric 302.

Figure 4:
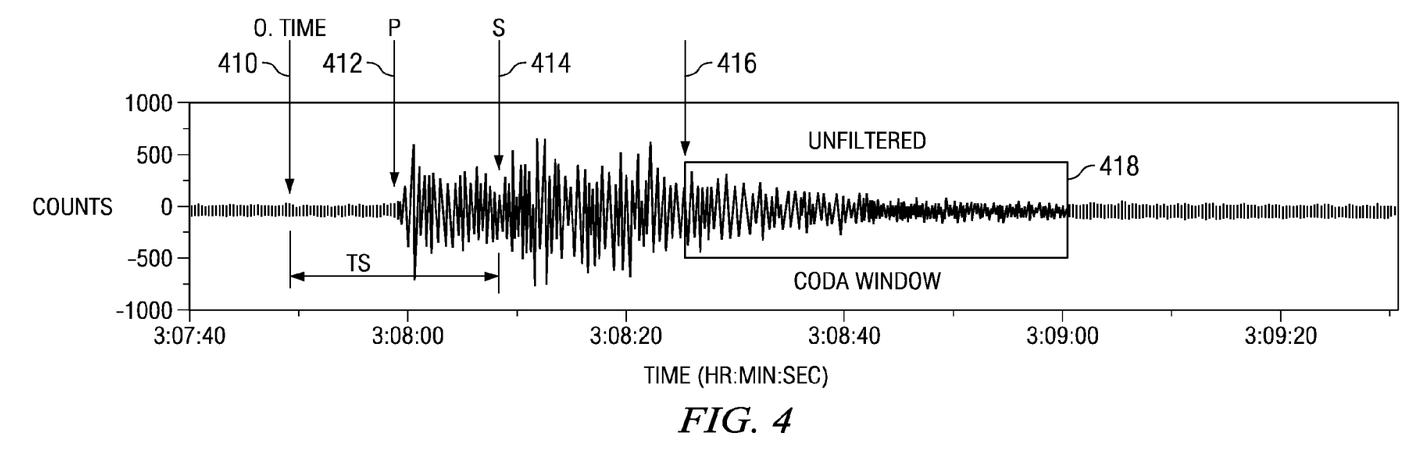
FIG. 4 depicts a typical amplitude versus frequency plot shown in accordance with an illustrative embodiment.

Referring now to FIG. 4, a typical amplitude versus frequency plot is shown in accordance with an illustrative embodiment. FIG. 4 is a record of a microseismic event, such as microseismic event 216 of FIG. 2, which has been recorded by a receiver, such as receiver 220 of FIG. 2.

A microseismic event occurs at initial time 410. At time p 412, the faster moving P-transverse waves arrive at a microseismic receiver, such as receiver 120 of FIG. 1. At time s 414, shear S-waves arrive at the microseismic receiver. Time c 416 indicates the start of S-coda window 418. Time c 416 occurs at a time that is equal to twice the difference between time s 414 and initial time 410. The end of S-coda window 418 is generally taken to be a point where the S-coda signal has decayed to a point where it is no longer distinguishable from the noise inherent from the receiver. S-coda window 418 contains S-coda data that is related to the microseismic event.

Figure 5:
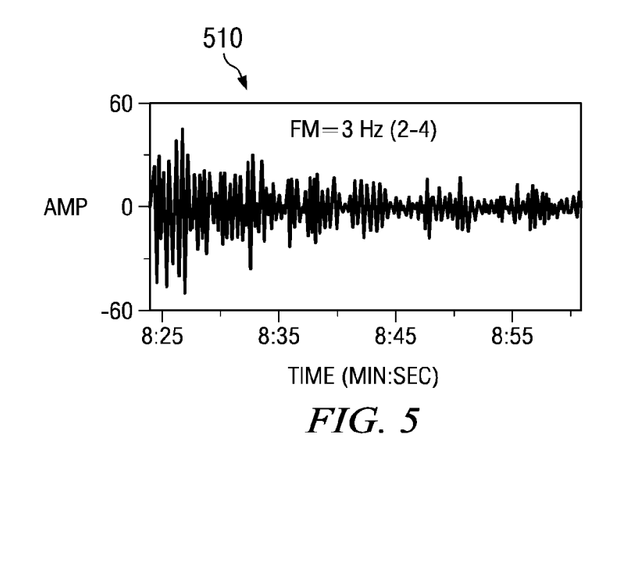
FIG. 5 depicts a typical bandpass filtered displacement of amplitudes of coda windows having undergone spectral decomposition shown for a frequency of 2-4 Hz, in accordance with an illustrative embodiment.

With reference now to FIG. 5, a diagram illustrating filtered S-coda data is depicted in accordance with an illustrative embodiment. FIG. 5 is a typical amplitude versus frequency analysis of bandpass filtered displacement amplitudes of an S-coda window, such as S-coda window 418 of FIG. 4, having undergone spectral decomposition. FIG. 5 is a bandpass filtered displacement amplitude of an S-coda window at a frequency of 2-4 Hz.

An S-coda window, such as S-coda window 418 of FIG. 4 is passed through a narrow bandwidth filter of 2-4 Hz to resolve S-coda window 418 of FIG. 4 into filtered S-coda window 510 having a narrow frequency range. Typically, higher seismic frequencies image thinner beds, while the lower seismic frequencies image thicker beds. Spectral decomposition allows the utilization of discrete components of the seismic bandwidth. By utilizing discrete frequency components, the different beds within the formation can be more accurately observed and discerned.

The narrow bandwidth filter can be any filter capable of resolving the S-coda signal into discrete wavelength ranges. The narrow bandwidth filter can be, without limitation, for example, a multilayer band pass filter, a front-end filter, a dielectric filter, an Hgh dielectric constant ceramic filter, a microstrip filter, an optical bandpass filter, an interdigital bandpass filter, a finite impulse response (FIR) filter, or other bandwidth filters known in the art.

Figure 6:
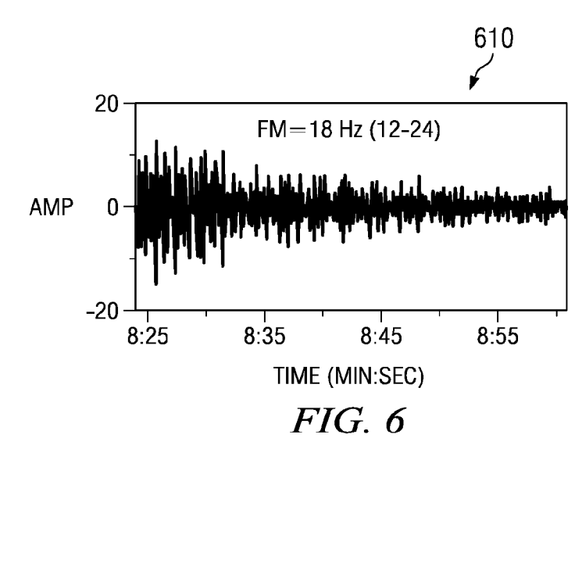
FIG. 6 depicts a typical bandpass filtered displacement amplitudes of coda windows having undergone spectral decomposition shown for a frequency of 12-24 Hz, in accordance with an illustrative embodiment.

With reference now to FIG. 6, a diagram illustrating filtered S-coda data is depicted in accordance with an illustrative embodiment. FIG. 6 is a typical amplitude versus frequency analysis of bandpass filtered displacement amplitudes of an S-coda window, such as S-coda window 418 of FIG. 4, having undergone spectral decomposition. FIG. 6 is a bandpass filtered displacement amplitude of an S-coda window at a frequency of 12-24 Hz.

An S-coda window, such as S-coda window 418 of FIG. 4, is passed through a narrow bandwidth filter of 12-24 Hz to resolve S-coda window 418 of FIG. 4 into filtered S-coda window 610 having a narrow frequency range. Typically, higher seismic frequencies image thinner beds, while the lower seismic frequencies image thicker beds. Spectral decomposition allows the utilization of discrete components of the seismic bandwidth. By utilizing discrete frequency components, the different beds within the formation can be more accurately observed and discerned.

The narrow bandwidth filter can be any filter capable of resolving the S-coda signal into discreet wavelength ranges. The narrow bandwidth filter can be, without limitation, for example, a multilayer band pass filter, a front-end filter, a dielectric filter, an Hgh dielectric constant ceramic filter, a microstrip filter, an optical bandpass filter, an interdigital bandpass filter, a finite impulse response (FIR) filter, or other bandwidth filters known in the art.

Based on the results obtained from the spectral decomposition in filtered S-coda windows 510 of FIG. 5 and 610 of FIG. 6, the root mean square amplitude from the instantaneous amplitudes is calculated. The root mean square (RMS) amplitude can be calculated from the instantaneous amplitudes using the following equation:

$$A_{RMS} = \sqrt{(\Sigma(P^2/N)}$$

where P is an instantaneous amplitude and N is the number of amplitude measurements in time waveform.

The relationship between the amplitude of the S-coda waves and the time at which they were recorded by the recorder is next determined. The relationship can be characterized linearly by plotting the natural log of the product of the RMS amplitude and time against time. That is, the relationship can be characterized linearly by:

$$LN(A_{RMS}*Time) \text{ versus Time}.$$

Figure 7:
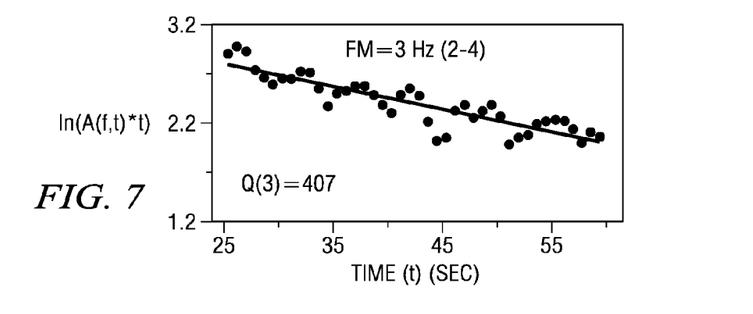
FIG. 7 is a typical root-mean-square amplitude value multiplied with lapse time along with best square fits of selected coda windows shown for frequencies of 2-4 Hz, in accordance with an illustrative embodiment.

With reference now to FIG. 7, a diagram illustrating the relationship between the amplitude of the S-coda waves and the time at which the S-coda waves were recorded is depicted in accordance with an illustrative embodiment. FIG. 7 depicts typical root-mean-square amplitude values multiplied with lapse time along with best square fits of filtered S-coda windows 510 of FIG. 5. That is, FIG. 7 is a graphical representation of:

$$LN(A_{RMS}*Time) \text{ versus Time}$$

FIG. 7 is determined for frequencies of 2-4 Hz. The root-mean-square amplitude value used is that of the central frequency of 3.0 Hz from the bandpass filtered displacement frequency ranges 2-4 Hz identified in FIG. 5.

Based on relationships between the amplitude of the S-coda waves and the time at which they were recorded, the Q-factor can be determined for the certain filtered frequency identified in FIG. 4. The Q-factor can be calculated using the following relation:

$$Q=\pi*f/b$$

where f is the central frequency of 3.0 Hz from the bandpass filtered displacement frequency ranges 2-4 Hz identified in FIG. 5; and b is the slope of the linear trend of the plot of $LN(A_{RMS}*Time)$ versus time, obtained, for example, in FIG. 7. A Q-factor of 407 was established for the 2-4 Hz frequency.

Figure 8:
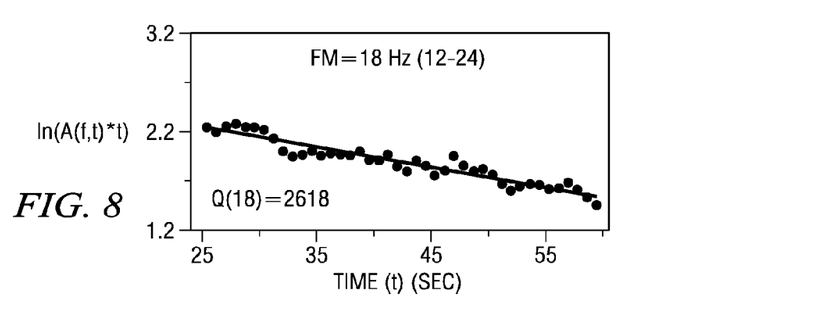
FIG. 8 is a typical root-mean-square amplitude value multiplied with lapse time along with the best square fits of selected coda windows shown for frequencies of 12-24 Hz, in accordance with an illustrative embodiment.

With reference now to FIG. 8, a diagram illustrating the relationship between the amplitude of the S-coda waves and the time at which the S-coda waves were recorded is depicted in accordance with an illustrative embodiment. FIG. 8 depicts typical root-mean-square amplitude values multiplied with lapse time along with best square fits of filtered S-coda windows 610 of FIG. 6. That is, FIG. 8 is a graphical representation of:

$$LN(A_{RMS}*Time) \text{ versus Time}$$

FIG. 8 is determined for frequencies of 2-4 Hz. The root-mean-square amplitude value used is that of the central frequency of 18.0 Hz from the bandpass filtered displacement frequency ranges 12-24 Hz identified in FIG. 6.

Based on relationships between the amplitude of the S-coda waves and the time at which they were recorded, the Q-factor can be determined for the certain filtered frequency identified in FIG. 4. The Q-factor can be calculated using the following relation:

$$Q=\pi*f/b$$

where
f is the central frequency of 18.0 Hz from the bandpass filtered displacement frequency ranges 12-24 Hz identified in FIG. 6; and b is the slope of the linear trend of the plot of $LN(A_{RMS}*Time)$ versus time, obtained, for example, in FIG. 7. A Q-factor of 2618 was established for the 12-24 Hz frequency.

Q-factors are then determined for each of the remaining geophones of the receivers, at each of the selected bandpass filtered frequencies. By analyzing the Q-factor at the location of each receiver, such as receiver 220 of FIG. 2, Q-factors can be determined at the various depths throughout the formation. The various Q-factor values obtained for each geophone can be plotted against receiver location to analyze the change of Q with depth.

A Q-factor is determined at each geophone of the recorder, for each of the selected frequencies. The various Q-factor values obtained for each geophone can be plotted against geophone locations to analyze the change of Q with depth.

Figure 9:
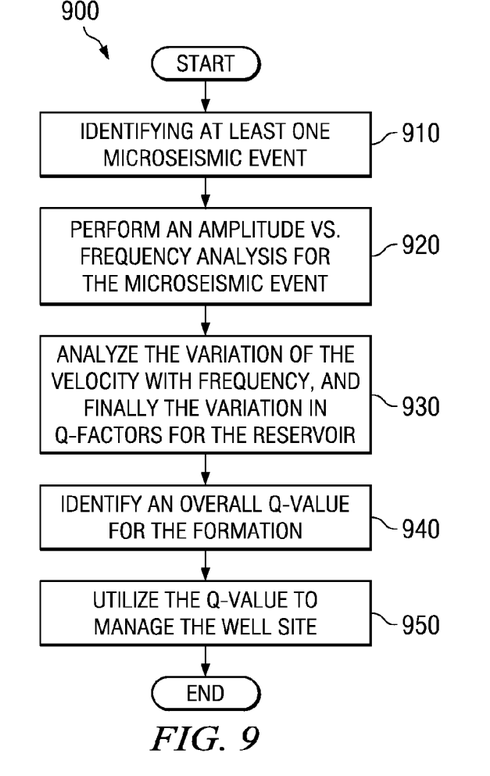
FIG. 9 is a high level flowchart depicting process steps shown, in accordance with an illustrative embodiment.

Referring now to FIG. 9, a high level flowchart of process steps is shown according with an illustrative embodiment. Process 900 is a software process executing on a software component, such as software component 226 of FIG. 2, executing on a data processing system, such as data processing system 224 of FIG. 2.

Process 900 begins by identifying a set of microseismic events (step 910). The set of microseismic events is at least one microseismic event, such as microseismic event 216 of FIG. 2. The set of microseismic events is recorded by a receiver, such as receiver 220 of FIG. 2, at a monitoring well, such as monitoring well 222 of FIG. 2. The identified set of microseismic events preferably has a good signal to noise ratio, with clearly defined P-wave and S-wave arrivals, as well as a defined S-coda window.

Responsive to identifying the set of microseismic events, an amplitude versus frequency analysis is performed for the set of microseismic events (step 920). The amplitude versus frequency analysis can be a plot of the amplitude and frequencies of the set of microseismic events, such as depicted in FIG. 6, as recorded by a receiver, such as receiver 220 of FIG. 2.

Utilizing a forward Fourier transform, amplitude and frequency can be found from the voltage generated by the receiver in response to the set of microseismic events. An amplitude and frequency analysis is performed to identify the beginning of the S-coda window. The start of the S-coda window is generally taken to be at a time of 2 ts, as indicated at time c 416 of FIG. 4. The end of the S-coda window is more ambiguous: the end of the S-coda window is generally taken to be a point where the S-coda signal has decayed to where it is no longer distinguishable from the noise inherent from the receiver.

The decrease of coda wave amplitude with lapse time at a particular frequency is only due to energy attenuation and diffusion from the rock matrix, but independent to seismic source, path propagation and site amplification. The attenuation of seismic waves is the sum of intrinsic and scattering attenuation, where in the first case the energy is converted to heat and in the second case it is redistributed through random refractions, reflections, and diffractions throughout the reservoir.

Responsive to performing the amplitude versus frequency analysis for the set of microseismic events, process 900 analyzes the variation of the velocity with frequency, and finally the variation in Q-factors for the reservoir (step 930). The variation in Q-factors within the reservoir can be used to better characterize the various different beds within the formation. Potential yields, production estimations, as well as general characterization of the well site formation can be modeled from the changes in Q-factors throughout the reservoir.

Responsive to analyzing the variation of the velocity with frequency, and the variation in Q-factors for the reservoir, process 900 identifies an overall Q-value for the formation (step 940). Process 900 then utilizes the Q-value to manage the well site (step 950), with the process terminating thereafter. By knowing the Q-factor, water saturation and hydrocarbon concentrations in a formation can be inferred. Better informed decisions regarding the drilling and production of hydrocarbons at the well site can therefore be made. For example, the information may be used to direct drilling operations for the well site.

Figure 10:
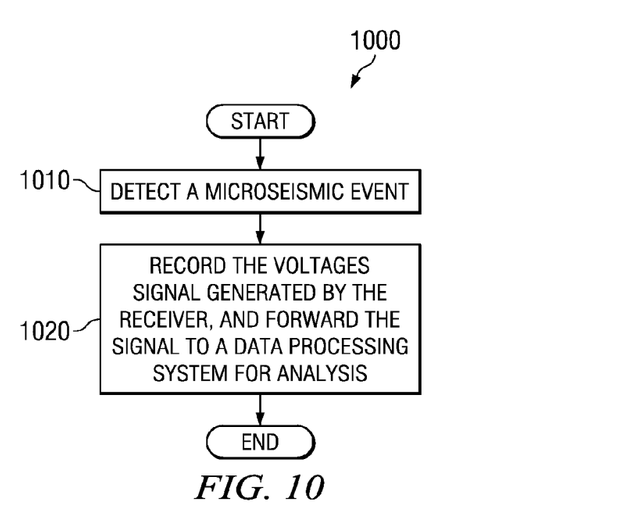
FIG. 10 is a flowchart for identifying at least one microseismic event shown, in accordance with an illustrative embodiment.

Referring now to FIG. 10, a flowchart for identifying at least one set of microseismic events is shown according to an illustrative embodiment. Process 1000 is a detailed view of the processing steps of step 910 of FIG. 9. Process 1000 occurs within a receiver, such as receiver 220 of FIG. 2.

Process 1000 begins by detecting a set of microseismic events (step 1010). The set of microseismic events is a vibration or series of vibrations caused by sudden failure of rock releasing stored strain energy. The set of microseismic events generates seismic waves, including the compressional primary waves (P waves), the shear secondary waves, (S waves), and the residual S-coda waves. The waves propagate away from the set of microseismic events and are detected by at least one receiver, such as receiver 220 of FIG. 2.

In these examples, the receiver is deployed in a monitoring well site within 2000 feet of a well undergoing hydraulic or other stimulation, at roughly the same depth as the treatment interval. The optimal placement and geometry of the receiver within the monitoring well helps to minimize noise and attenuation in the signal, while providing separation of arrival times of the P-waves, the S-waves, and the S-coda waves when they are detected at the receiver. That is, the optimal placement allows the P-waves, the S-waves, and the S-coda waves to be distinguished from each other in a typical amplitude versus frequency plot, such as depicted in FIG. 4. The optimal placement and geometry of the receiver within the monitoring well is heavily dependent on the surrounding velocity structure, so accurate earth models help optimize the monitoring configuration.

Process 1000 records the voltages signal generated by the receiver, and forwards the recorded data to a data processing system for analysis (step 1020), with the process terminating thereafter. The data processing system can be data processing system 224 of FIG. 2. The identified set of microseismic events preferably has a good signal to noise ratio, with clearly defined P-wave and S-wave arrivals, as well as a defined S-coda window.

Figure 11:
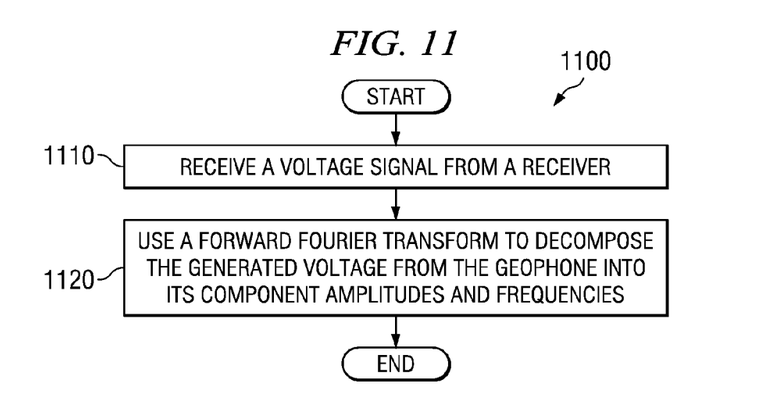
FIG. 11 is a flowchart for forming an amplitude versus frequency analysis of the microseismic event shown, in accordance with an illustrative embodiment.

Referring now to FIG. 11, a flowchart for forming amplitude versus frequency analysis of the set of microseismic events is shown according to an illustrative embodiment. Process 1100 is a software process executing on a software component, such as software component 226 of FIG. 2, executing on a data processing system, such as data processing system 224 of FIG. 2. Process 1100 is process step 920 of FIG. 9.

Process 1100 begins by receiving a voltage signal from a receiver (step 1110), such as receiver 220 of FIG. 2. The receiver is comprised of one or more geophones. The geophone typically consists of a mass suspended on a spring. A wire is wrapped around the mass. A magnet, that is stationary with respect to the surrounding formation, surrounds the wire-wrapped mass. When the ground moves, such as when a microseismic event occurs, the mass tends to remain motionless, while the magnet moves with the surrounding formation, around the mass. The magnetic field of the moving magnet produces an electrical voltage in the wire. This voltage is amplified and recorded by a simple voltmeter. The voltage recorded by the voltmeter is proportional to the magnitude at which the ground is moving.

Process 1100 then uses a forward Fourier transform to decompose the generated voltage from the geophone into its component amplitudes and frequencies (step 1120), with the process terminating thereafter. The amplitude versus frequency analysis can be a plot of the amplitude and frequencies of the microseismic event, such as depicted in FIG. 6.

From the plot generated, relevant events within the microseismic event are easily seen. A microseismic event occurs at initial time. At time p, such as time p 412 in FIG. 4, the faster moving P-transverse waves arrive at the receiver, such as receiver 220 of FIG. 2. At time s, such as time s 414 of FIG. 4, shear S-waves arrive at the microseismic receiver. The S-coda window, such as S-coda window 418 of FIG. 4, begins at time c, such as time c 416 of FIG. 4. Time c occurs at a time that is equal to twice the difference between time s and initial time at which the microseismic event occurred. The end of the S-coda window is more ambiguous: the end of the S-coda window is generally taken to be a point where the S-coda signal has decayed to where it is no longer distinguishable from the noise inherent from the receiver.

The decrease of coda wave amplitude with lapse time at a particular frequency is not only due to energy attenuation and diffusion from the rock matrix, but also independent to seismic source, path propagation, and site amplification. The attenuation of seismic waves is the sum of intrinsic attenuation, where the energy is converted to heat, and scattering attenuation, where the energy is redistributed through random refractions, reflections, and diffractions throughout the reservoir.

Figure 12:
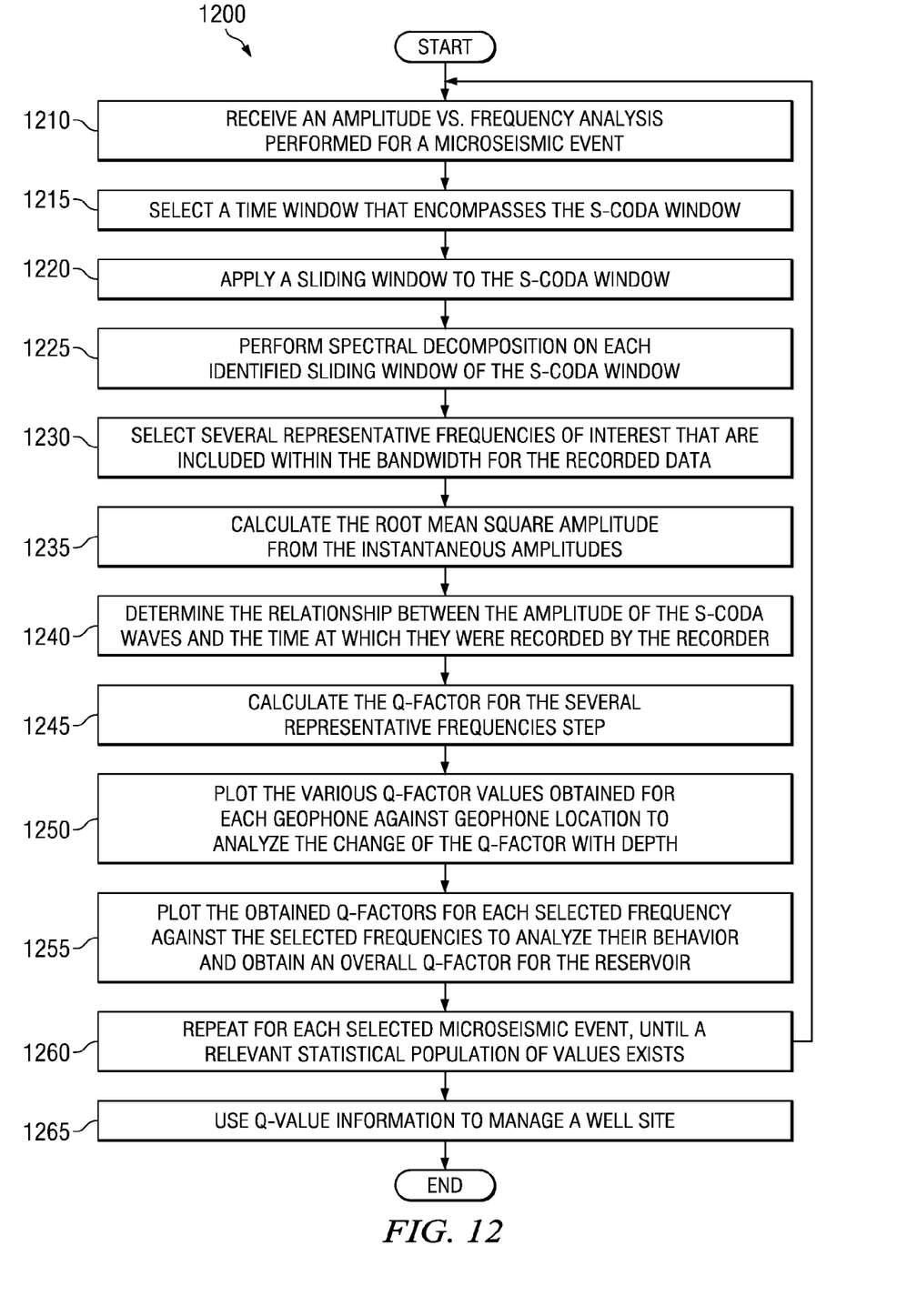
FIG. 12 is a flowchart for analyzing the variation of the velocity with frequency to determine the variation in Q-factors for the field according to an illustrative embodiment.

Referring now to FIG. 12, a flowchart for estimating Q-factors is shown in accordance with an illustrative embodiment. In these examples, process 1100 is employed to analyzing the variation of the velocity with frequency to determine the variation in Q-factors for the field. Process 1200 is a software process, executing on a software component, such as software component 226 of FIG. 2, and process 1200 is a more detailed description of step 930 of FIG. 9.

Process 1200 begins by receiving an amplitude versus frequency analysis performed for a microseismic event (step 1210). The amplitude versus frequency analysis can be a plot of the amplitude and frequencies of the microseismic event, such as depicted in FIG. 6, as recorded by a receiver, such as receiver 220 of FIG. 2. The amplitude versus frequency analysis can be the analysis described in step 920 of FIG. 9.

The start of the S-coda window is generally taken to be at a time of 2 ts, as indicated at time c 416 of FIG. 4. The end of the S-coda window is more ambiguous: the end of the S-coda window is generally taken to be a point where the S-coda signal has decayed to where the S-coda signal is no longer distinguishable from the noise inherent in the receiver.

A time window is selected that encompasses the S-coda window (step 1215). The start of the S-coda window is generally taken to be at a time of 2 ts, as indicated at time c 416 of FIG. 4. That is, The start of the S-coda window is generally taken to be at a time of 2 ts, or $$S\text{-coda}_{time} = 2(S_{time} - O_{time})$$

where $S\text{-coda}_{time}$ is the start of the S-coda window, $S_{time}$ is the start of the S-wave window, and $O_{time}$ is the microseismic event origin time.

The end of the S-coda window is more ambiguous: the end of the S-coda window is generally taken to be a point where the S-coda signal has decayed to where it is no longer distinguishable from the noise inherent in the receiver.

Based on the length of the S-coda window, a sliding window is applied to the S-coda window (step 1220). A sliding window is a statistical smoothing technique for treatment of the S-coda window, used to make the long term trends of the S-coda time series clearer. While the embodiment is described as using a sliding window, other statistical treatments, such as moving averages, may also be used. Likewise, statistical smoothing of the data may be eliminated entirely.

An initial sliding window is selected, based on the size of the S-coda window. A step size is then selected for changing the size of the window in subsequent runs. For example, if the S-coda window is identified as having a length of 150 milliseconds, the initial window applied for statistical smoothing could be 30 milliseconds (ms). If 4 runs are determined, the size of subsequent sliding windows may be identified as 60 ms, 90 ms, and 120 ms.

Spectral decomposition is then performed on each identified sliding window of the S-coda window (step 1225). Spectral decomposition can be performed with a narrow bandwidth filter. Reflections from a formation have characteristic expressions in the frequency domain that is indicative of the formation's thickness. Higher decomposed frequencies typically provide more accurate images of thinner formations, while lower decomposed frequencies provide more accurate images of thicker formations. Spectral decomposition converts time or depth seismic data to the frequency domain. This spectral decomposition may be performed using a suitable process or algorithm such as a Discrete Fourier Transform or a Maximum Entropy method. Spectral decomposition allows an engineer or other user to analyze independently each frequency revealing previously obscured features of the various formations.

The narrow bandwidth filter can be any filter capable of resolving the S-coda signal into discreet wavelength ranges. The narrow bandwidth filter can be, without limitation, for example, a multilayer band pass filter, a Front-end filter, a dielectric filter, an Hgh dielectric constant ceramic filter, a microstrip filter, an optical bandpass filter, an interdigital bandpass filter, a finite impulse response (FIR) filter, or other bandwidth filters known in the art.

When the S-coda wave is decomposed into its single frequencies, process 1200 then selects several representative frequencies of interest that are included within the bandwidth for the recorded data (step 1230). These representative frequencies can be determined by a separate analysis by a cooperating data analysis process. Conversely, the representative frequencies can be predetermined based on typically observed representative frequencies. The representative frequencies can similarly be site specific user inputs.

Based on the results from the amplitude versus frequency analysis, process 1200 calculates the root mean square amplitude from the instantaneous amplitudes (step 1235). The root mean square (RMS) amplitude can be calculated from the instantaneous amplitudes using the following equation:

$$A_{RMS} = \sqrt{(\Sigma(P^2/N)}$$

where P is an instantaneous amplitude and N is the number of amplitude measurements in time waveform.

Furthermore, process 1200 determines the relationship between the amplitude of the S-coda waves and the time at which they were recorded by the recorder (step 1240). The relationships can be characterized linearly by plotting the natural log of the product of the RMS amplitude and time against time. That is, process 1200 plots:

$$LN(A_{RMS}*Time) \text{ versus time.}$$

Typical $LN(A_{RMS}*Time)$ versus time plots are illustrated in FIG. 7 and FIG. 8. The root-mean-square amplitude values used therein are those of the central frequencies of 3.0 and 18.0 Hz from the bandpass filtered displacement frequency ranges 2-4 Hz and 12-24 Hz respectively identified in FIG. 5 and FIG. 6.

Based on the relationship established in step 1240, the Q-factor is calculated for the several representative frequencies (step 1245). Process 1200 can calculate the Q-factor using the following relation:

$$Q = \pi * f/b$$

where
b is the slope of the linear trend of the plot of $LN(A_{RMS}*Time)$ versus time; and
f is the frequency.

As indicated in FIG. 7 and FIG. 8, a Q-factor of 407 was established for the 2-4 Hz frequency, while a Q-factor of 2618 was established for the 12-24 Hz frequency. A data processing system, such as data processing system 224 of FIG. 2, determines the slope of the linear trend of the resulting plot. A plot of $LN(A_{RMS}*Time)$ versus time is determined for each selected frequency of each geophone.

Once the Q-factor is calculated for the several representative frequencies, the various Q-factor values obtained for each geophone can be plotted against geophone location to analyze the change of the Q-factor with depth (step 1250). A separate Q-factor is obtained for each of the selected frequencies.

Process 1200 then plots the obtained Q-factors for each selected frequency against the selected frequencies (step 1255) to analyze their behavior and obtain an overall Q-factor. From the slope of the chart, the variation of the velocity with frequency is determined taking into account the relation:

$$Q = \pi * f/b * V$$

where b is the slope of the linear trend of the plot of $LN(A_{RMS}*Time)$ versus time, obtained, for example, in FIG. 7 and FIG. 8;
f is the frequency; and
V is the velocity of the selected frequency.

Process 1200 can be repeated for each selected microseismic event by returning to step 1210, until a relevant statistical population of Q-values exists (step 1260). Once a relevant statistical population of Q-values is determined, Q-value information may be used in the management of a well site (step 1265) or in the determination of potential drilling sites, with the process terminating thereafter. For example, the information may be used to direct drilling operations for the well site. The mean of the statistical population provides an overall Q-factor for the formation being treated. The value or range of values may be used as input for further modeling or overall knowledge of the formation for future interests.

Thus, the different illustrative embodiments provide a method, apparatus, and computer program product for managing a well site by estimating the Q-factor using S-coda waves obtained from the microseismic events recorded during reservoir monitoring. After the P- and S-wave arrivals are identified, the S-coda window is extracted from the microseismic event traces and used as the input of a spectral decomposition application. When the coda wave is decomposed into its single frequencies, several frequencies of interest that are included within the bandwidth of the data are chosen, taking into account that the maximum recoverable frequency is the Nyquist frequency. Using the slope of the linear trend for the ply of the $LN(A_{RMS}*Time)$ versus time, the values of Q-factor for each single frequency can be estimated. Then for each geophone, the same operation is repeated and a plot of Q-factor versus geophone location provides a sense of the attenuation (1/Q) with depth. Also from the slope of the plot of Q versus frequencies, the relations between velocity, Q, and frequency can be determined. Using several microseismic events within the formation, the variation of Q can be studied within an area to differentiate different zones with contrasting attenuation properties. Also, when calculating the spectral decomposition, different sliding windows can be used to compare the variations of the Q-factor versus time of propagation, which may be useful to observe the attenuation changes within an interval.

Data obtained from the Q-factor determination can be used during the well site production to plan drill sites in a formation field. Surrounding formation and rock matrices can be better modeled to more accurately provide information to engineers regarding a formation's likely content and production value. By knowing the Q-factor, water saturation, and hydrocarbon concentrations in a formation can be inferred. Therefore, better informed decisions regarding the drilling and production of hydrocarbons at the well site can be made.

Although the foregoing is provided for purposes of illustrating, explaining and describing certain embodiments of the invention in particular detail, modifications and adaptations to the described methods, systems and other embodiments will be apparent to those skilled in the art and may be made without departing from the scope or spirit of the invention.

What is claimed is:

1. A method for identifying a quality factor in a well site, the method comprising:
   detecting a microseismic event using a microseismic receiver;
   determining a start time of a s-coda window based on a first time when a plurality of longitudinal shear waves (s-waves) is received by the microseismic receiver and a second time when the microseismic event begins;
   generating the s-coda window, using the start time, for identifying secondary coda wave data from the microseismic event;
   collecting the secondary coda wave data based on the s-coda window, wherein the secondary coda wave data represents a plurality of secondary coda waves that follows the plurality of s-waves, and wherein the plurality of secondary coda waves represents residual vibrations of the microseismic event; and
   identifying the quality factor using the secondary coda wave data.

2. The method of claim 1, wherein the method further comprises:
   generating the microseismic event at a first location, wherein the microseismic event is recorded at a second location different from the first location.

3. The method of claim 2, wherein the first location is a well bore and the microseismic event is generated from a hydraulic fracture from the well bore.

4. The method of claim 1, wherein the microseismic event is recorded with at least one multi-component geophone.

5. The method of claim 1, wherein generating the s-coda window for identifying the secondary coda wave data comprises recording an amplitude of the microseismic event and a frequency of the microseismic event.

6. The method of claim 1, wherein the secondary coda wave data comprises a set of frequencies, the method further comprising:
   decomposing the set of frequencies into a plurality of single frequencies; and
   selecting a plurality of representative frequencies from the plurality of single frequencies.

7. The method of claim 6, wherein identifying the quality factor using the secondary coda wave data comprises identifying a corresponding quality factor for each of the plurality of representative frequencies.

8. The method of claim 1, further comprising:
   generating the microseismic event from a hydraulic fracture.

9. The method of claim 1 further comprising:
   determining a potential drilling site using the quality factor.

10. A method for managing a well site, the method comprising:
    detecting a microseismic event using a microseismic receiver;
    determining a start time of a s-coda window based on a first time when a plurality of longitudinal shear waves (s-waves) is received by the microseismic receiver and a second time when the microseismic event begins;
    generating the s-coda window, using the start time, for identifying secondary coda wave data from the microseismic event;
    collecting the secondary coda wave data based on the s-coda window, wherein the secondary coda wave data represents a plurality of secondary coda waves that follows the plurality of s-waves, and wherein the plurality of secondary coda waves represents residual vibrations of the microseismic event;
    identifying a quality factor using the secondary coda wave data; and
    using the quality factor for managing the well site.

11. The method of claim 10, wherein the method further comprises:
    generating the microseismic event at a first location, wherein the microseismic event is recorded at a second location different from the first location.

12. The method of claim 11, wherein the microseismic event is generated from a hydraulic fracture from the well bore.

13. The method of claim 10, wherein the microseismic event is recorded with at least one multi-component geophone.

14. The method of claim 10, wherein generating the s-coda window for identifying the secondary coda wave data comprises recording an amplitude of the microseismic event and a frequency of the microseismic event.

15. The method of claim 10, wherein the secondary coda wave data comprises a set of frequencies, the method further comprising:
    decomposing the set of frequencies into a plurality of frequency ranges; and
    selecting a plurality of representative frequencies from the plurality of frequency ranges.

16. The method of claim 15, wherein identifying the quality factor using the secondary coda wave data comprises identifying a corresponding quality factor for each of the plurality of representative frequencies.

17. The method of claim 16 further comprising:
    generating the microseismic event from a hydraulic fracture.

18. A data processing system comprising:
    a bus;
    a communications unit connected to the bus;
    a storage device connected to the bus, wherein the storage device includes computer usable program code; and
    a processor unit connected to the bus, wherein the processor unit executes the computer usable program code to:
      detect a microseismic event using a microseismic receiver;
      determine a start time of a s-coda window based on a first time when a plurality of longitudinal shear waves (s-waves) is received by the microseismic receiver and a second time when the microseismic event begins;
      generate the s-coda window, using the start time, to identify secondary coda wave data from the microseismic event;
      collect the secondary coda wave data based on the s-coda window, wherein the secondary coda wave data represents a plurality of secondary coda waves that follows the plurality of s-waves, and wherein the plurality of secondary coda waves represents residual vibrations of the microseismic event; and identify a quality factor using the secondary coda wave data.

19. The data processing system of claim 18, wherein generating the s-coda window to identify the secondary coda wave data comprises the processor unit further executing the computer usable program code to record an amplitude of the microseismic event and a frequency of the microseismic event.

20. The data processing system of claim 18, wherein the secondary coda wave data comprises a set of frequencies, and wherein the processor unit further executes the computer usable program code to:
   decompose the set of frequencies into a plurality of frequency ranges; and
   select a plurality of representative frequencies from the plurality of frequency ranges.

21. The data processing system of claim 20, wherein identifying the quality factor for the set of frequencies comprises the processor unit further executing the computer usable program code to:
   identify a corresponding quality factor for each of the plurality of representative frequencies; and
   analyze a variation in velocities of the plurality of representative frequencies to determine variations in formation and rock composition.

22. An apparatus for modeling formation and rock matrices in a well site, the apparatus comprising:
   a receiver for recording microseismic events; and
   a data processing system comprising:
      a bus;
      a communications unit connected to the bus;
      a storage device connected to the bus, wherein the storage device includes computer usable program code; and
      a processor unit connected to the bus, wherein the processor unit executes the computer usable program code to:
         record a microseismic event using the receiver;
         determine a start time of a s-coda window based on a first time when a plurality of longitudinal shear waves (s-waves) is received by the receiver and a second time when the microseismic event begins;
         generate the s-coda window, using the start time, to identify secondary coda wave data within the microseismic event;
         collect the secondary coda wave data based on the s-coda window, wherein the secondary coda wave data represents a plurality of secondary coda waves that follows the plurality of s-waves, and wherein the plurality of secondary coda waves represents residual vibrations of the microseismic event; and
         identify a quality factor using the secondary coda wave data.

23. The apparatus of claim 22, wherein the secondary coda wave data comprises a set of frequencies, and wherein the processor unit further executes the computer usable program code to:
   decompose the set of frequencies into a plurality of frequency ranges; and
   select a plurality of representative frequencies from the plurality of frequency ranges.

24. The apparatus of claim 23, wherein identifying the quality factor for the set of frequencies comprises the processor unit further executing the computer usable program code to:
   identify a corresponding quality factor for each of the plurality of representative frequencies; and
   analyze a variation in velocities of the plurality of representative frequencies to determine variations in formation and rock composition.

25. A computer program product comprising a computer readable medium having computer usable program code for identifying a quality factor, the computer program product comprising:
   computer usable program code for recording a microseismic event using a microseismic receiver;
   computer usable program code for determining a start time of a s-coda window based on a first time when a plurality of longitudinal shear waves (s-waves) is received by the microseismic receiver and a second time when the microseismic event begins;
   computer usable program code for generating the s-coda window, using the start time, for identifying secondary coda wave data within the microseismic event;
   computer usable program code for collecting the secondary coda wave data based on the s-coda window, wherein the secondary coda wave data represents a plurality of secondary coda waves that follows the plurality of s-waves, and wherein the plurality of secondary coda waves represents residual vibrations of the microseismic event; and
   computer usable program code for identifying a quality factor using the secondary coda wave data.

* * * * *